No. 830,641. PATENTED SEPT. 11, 1906.
J. A. BROWN.
YIELDABLE GEAR WHEEL.
APPLICATION FILED NOV. 23, 1905.
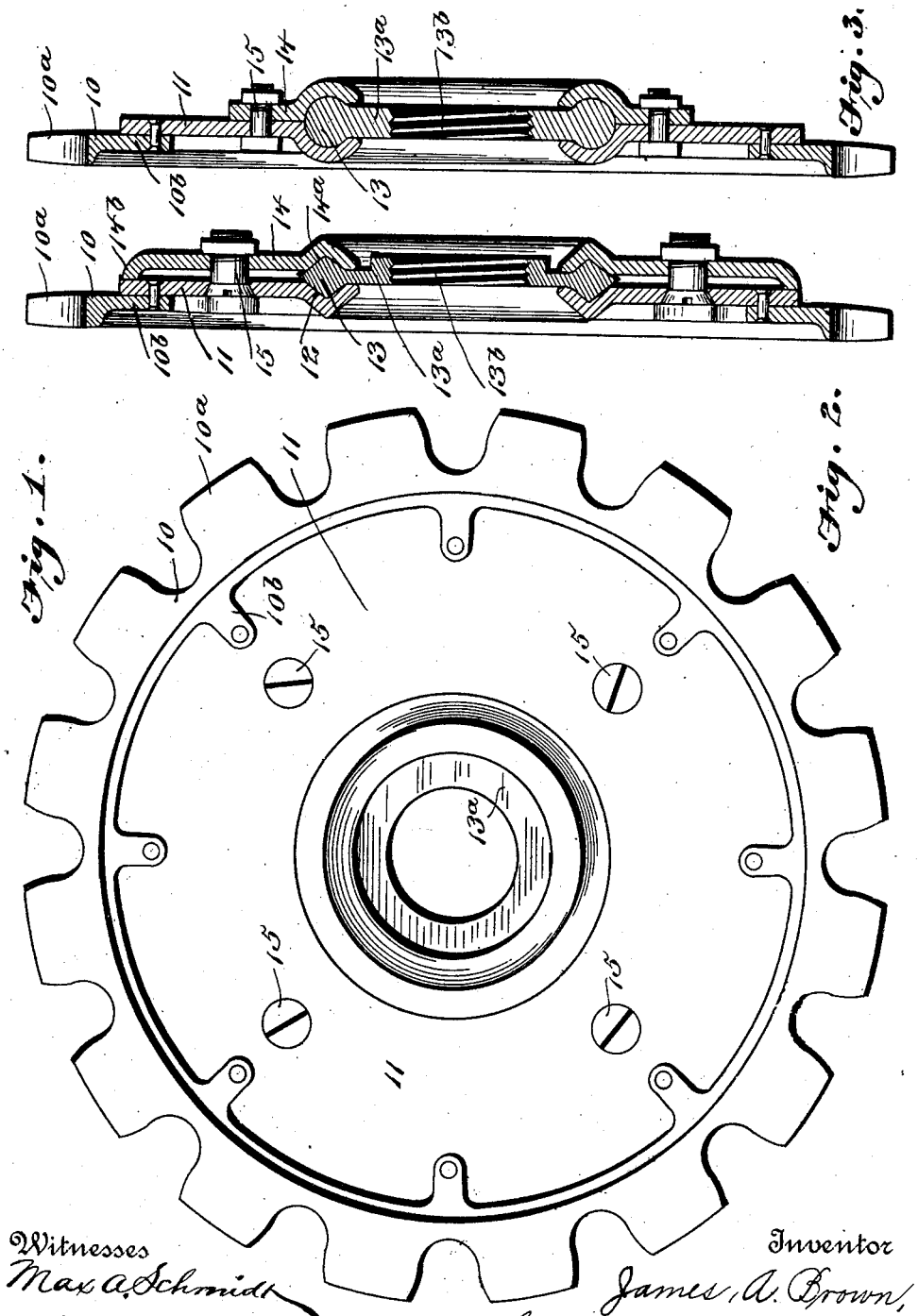

UNITED STATES PATENT OFFICE.

JAMES A. BROWN, OF CHICAGO, ILLINOIS.

YIELDABLE GEAR-WHEEL.

No. 830,641. Specification of Letters Patent. Patented Sept. 11, 1906.

Application filed November 23, 1905. Serial No. 288,732.

*To all whom it may concern:*

Be it known that I, JAMES A. BROWN, a citizen of the United States, residing at Chicago, in the county of Cook and State of Illinois, have invented new and useful Improvements in Yieldable Gear-Wheels, of which the following is a specification.

This device is a yieldable gear-wheel especially intended for motor-cycles, but may be applied to other vehicles and machines.

The object of the invention is to take up the sudden jar or strain from starting or stopping the motor and also prevent any undue vibration while the motor is running.

In the accompanying drawings, Figure 1 is a plan view of the device. Fig. 2 is a transverse section of the same. Fig. 3 is a similar section showing a modification.

In the drawings, 10 indicates a rim provided with sprocket-teeth $10^a$. This rim is provided with inwardly-extending lugs $10^b$, to which is riveted an annular disk or plate 11. This disk has at its inner edge an annular groove or recess 12, preferably formed by upsetting or bending the metal, as shown, into which groove is fitted a friction-ring 13 of corresponding shape. This ring is carried by a central hub or plate $13^a$, provided with means for mounting the same upon a shaft—as, for instance, screw-threads $13^b$—and by which it may be attached to the axle or hub of the cycle. Opposite the annular disk 11 is another annular disk or plate 14, provided with a similar groove $14^a$, and these plates are clamped together to any desired degree of pressure by bolts 15. The outer ring of the disk 14 is dished or bent inwardly, as at $14^b$, so that a space is produced between the disks, allowing the disks to be adjusted toward or from each other and giving a spring tension.

In Fig. 3 I have shown a modification of the friction ring or clutch, the rim 13 being rounded instead of angular and the disk 14 being a narrower ring without the dished rim.

In use the friction between the rim 13 and the disks normally causes all parts to turn together, but in case of undue strain the parts will slip with respect to each other, and thus cause the gear to yield. The clamping-bolts allow adjustment of the friction.

I claim—

1. A yieldable gear-wheel having a central disk adapted for attachment to a shaft and having an enlarged rim at the outer edge, and two outer annular disks clamped together and having grooves at their inner edges in which said rim fits.

2. A yieldable gear-wheel having a central disk with an enlarged rim at its outer edge, and two outer annular disks adjustably clamped together and having at their inner edges opposite grooves in which the said rim is clamped, one of the outer disks having a dished rim at its outer edge which bears on the other disk and spaces the disks apart.

In testimony whereof I have signed my name to this specification in the presence of two subscribing witnesses.

JAMES A. BROWN.

Witnesses:
H. G. BATCHELOR,
SIGNA FELTSKOG.